United States Patent

Mercer

Patent Number: 5,982,148
Date of Patent: Nov. 9, 1999

[54] METHOD AND APPARATUS FOR MONITORING THE SELF DISCHARGE OF A SECONDARY BATTERY UPON COMPLETION OF A CHARGE CYCLE

[75] Inventor: Mark J. Mercer, Tucson, Ariz.

[73] Assignee: National Semiconductor Corporation, Santa Clara, Calif.

[21] Appl. No.: 09/102,985

[22] Filed: Jun. 22, 1998

[51] Int. Cl.$^6$ ........................................ H02J 7/00

[52] U.S. Cl. ........................................ 320/134; 320/164

[58] Field of Search .................. 320/128, 162, 320/163, 164, 134, 136; 324/433; 340/636

[56] References Cited

U.S. PATENT DOCUMENTS

| | | | |
|---|---|---|---|
| 5,530,336 | 6/1996 | Eguchi et al. | 320/134 |
| 5,631,537 | 5/1997 | Armstong | 320/15 |

OTHER PUBLICATIONS

Product information, "Benchmarq bq2054 Lithium Ion Fast Charger", Sep., 1996, 14 pages.

*Primary Examiner*—Peter S. Wong
*Assistant Examiner*—K. Shin
*Attorney, Agent, or Firm*—Skjerven, Morrill, MacPherson, Franklin & Friel LLP; Edward C. Kwok; Carmen C. Cook

[57] ABSTRACT

A battery charger monitors the terminal voltage of a secondary battery connected thereto with no appreciable depletion of the battery energy. Upon the completion of the charge cycle, the battery charger monitors the terminal voltage of the battery by first creating a high impedance node at the battery low side, and then regulating the battery high side voltage to a value below the maximum allowable terminal voltage for the battery. The battery low side voltage will decreases in response to a value below ground. The charger monitors the terminal voltage across the battery by measuring the battery low side voltage When the battery charger detects that the battery has discharged to a predetermined capacity level, the charger initiates a charge maintenance mode. The battery charger either refreshes the battery or maintains the battery at the predetermined capacity level.

23 Claims, 5 Drawing Sheets

METHOD AND APPARATUS FOR MONITORING THE SELF DISCHARGE OF A SECONDARY BATTERY UPON COMPLETION OF A CHARGE CYCLE

BACKGROUND OF THE INVENTION

1. Field of the Invention

The invention generally relates to battery chargers; and in particular, the present invention relates to a method and an apparatus for monitoring the self-discharge of a secondary battery.

2. Background of the Invention

A conventional battery charger for lithium-ion (Li+) batteries charges a battery until either a predetermined period of time has elapsed or the charge current drops below a predetermined threshold. Once the charge cycle is terminated, the charge current is interrupted so that no current flows into the battery. The interruption of the charge current is necessary because an indefinite flow of charge current into a Li+ battery that has already reached its prescribed maximum allowable terminal voltage will degrade the battery's life cycle.

After the charge cycle is terminated and the charge current is interrupted, the charger enters a float period, also called a monitor period, where the battery stays connected to the charger but is allowed to float. The float period lasts until the battery is removed from the charger for use in a desired application. Thus, the float period can last indefinitely.

If the battery is not removed from the charger for use immediately after it is fully charged, the energy stored in the battery will gradually leak away. Two mechanisms account for the leakage of energy during the float period. First, lithium ion batteries are susceptible to self-discharge. Therefore, a Li+ battery left sitting on a shelf will eventually lose all of its stored energy. The self-discharge mechanism is a function of the battery chemistry and physical construction, and cannot be prevented. Because it is desirable to maintain a battery at its full capacity while the battery is left in the charger, a conventional battery charger monitors the capacity of the battery during the float period, and takes measures to recharge, or refresh, the battery back up to its full capacity whenever energy is lost through self-discharge. However, the monitor circuit used in most conventional chargers significantly contributes to the second leakage mechanism of Li+ batteries during the float period.

A charger controller in a conventional battery charger uses either an external or an internal shunt resistor network to monitor the terminal voltage across a battery. FIG. 1 illustrates a conventional battery charger employing an external shunt resistor network connected to a charger controller 10. The shunt resistor network includes a first resistor 12 and a second resistor 14 which are connected in series. One side of first resistor 12 is connected to a Battery High Side terminal 22. One side of second resistor 14 is connected to a Battery Low Side terminal 24. The node between first resistor 12 and second resistor 14 is connected to a BAT input of charger controller 10. The resistor network senses the battery voltage across High Side terminal 22 and Low Side terminal 24 and provides an attenuated version of the battery voltage between the BAT and SNS inputs of charger controller 10. A third resistor 16 monitors the current flow into the battery. Use of a shunt resistor network to monitor the battery's terminal voltage has several disadvantages.

First, in the shunt resistor network of FIG. 1, measurement accuracy of the attenuated voltage is set by the resistor matching accuracy. When external resistors are used, non-standard resistor values with high accuracy are required to provide the proper resistor ratio set points. The resistor requirements can significantly increase implementation cost. Second and more importantly, the shunt resistor network provides a current path for discharging the battery. If the resistor values used in the divider network are too large, measurement accuracy is compromised by noise susceptibility. However, if the resistor values used in the divider network are too small, the battery will be excessively loaded. The battery can be drained of its stored energy by the monitoring process. Thus, the shunt resistor network is undesirable for use in a battery charger because the shunt resistor network depletes the battery's energy while monitoring its terminal voltage.

Therefore, it is desirable to provide a means to monitor the battery voltage in a charger which does not contribute significantly to the discharge of the battery. A desirable charger controller should minimize the amount of energy loss attributable to monitoring of the battery's terminal voltage and be capable of refreshing a battery for energy lost due to self-discharge.

Another disadvantage of the shunt resistor network is that because the battery is discharged by the monitoring process, the battery is subjected to multiple discharge and recharge cycles in order to maintain a full capacity. For most type of rechargeable batteries, repeated discharge and recharge cycles reduce the useful life of the batteries. Therefore, it is desirable to minimize the number of times a battery has to be recharged back up to its full capacity during the float period.

SUMMARY OF THE INVENTION

According to the present invention, a battery charger monitors the terminal voltage of a secondary battery without appreciably depleting the energy stored therein. A battery connected to the battery charger of the present invention becomes discharged primarily through self-discharge.

In one embodiment, a battery charger includes (a) a charger controller having a high side sense input terminal, a low side sense input terminal, and a switch control output terminal; and (b) a first switch connected across the low side sense input terminal and a ground node and controlled by the switch control output terminal of the charger controller. A secondary battery is connected across the high side sense input terminal and the low side sense input terminal of the charger controller. The first switch controls the flow of charge current through the battery. In another embodiment, a current sense resistor is connected between the first switch and the ground node for measuring the charge current flowing through the battery.

Upon the completion of the charge cycle, the battery charger monitors the terminal voltage of the battery. First, the charger controller creates a high impedance node at the battery low side. Then, the charger controller regulates the battery high side voltage to a value below the maximum allowable terminal voltage for the battery. In response, the battery low side voltage will decrease to a value below ground since the battery is in a fully charged state and is left floating. The charger controller monitors the terminal voltage across the battery by measuring the battery low side voltage.

In the present embodiment, the charger controller creates the high impedance node at the low side of the battery by making the low side sense input terminal to be high impedance and applying a predefined voltage to the first switch to open the switch. The high impedance node is created to float the battery and to significantly reduce the current that flows between the high side and the low side of the battery through the controller circuit.

In another embodiment, the first switch is a field effect transistor (FET) having a gate terminal controlled by the switch control output terminal, a drain terminal connected to the low side sense input terminal, and a source terminal connected to a ground node. The charger controller turns the FET on and off through the switch control output terminal. In an alternate embodiment, a current sense resistor can be connected between the source terminal of the FET and the ground node.

In another embodiment, the charger controller includes a comparator, a second switch, and control logic. The second switch is connected between the low side sense input terminal and a bias voltage. The charger controller opens the second switch to make low side sense input terminal high impedance. The comparator compares the battery low side voltage to a reference voltage. As the battery discharges through self-discharge, the battery low side voltage rises while the battery high side voltage is held constant because it is regulated at a fixed value. When the battery low side voltage rises to a level equal to the reference voltage, the comparator output changes state, causing control logic within the charger controller to initiate a charge maintenance mode.

In one embodiment of the charge maintenance mode, the battery charger refreshes the battery. Thus, any energy loss due to self-discharge of the battery is replaced and the battery remains fully charged while connected to the charger. In another embodiment of the charge maintenance mode, the battery charger operates to prevent further capacity loss and maintain the battery capacity at the predetermined capacity level the battery has discharged to.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

According to the present invention, a battery charger monitors the terminal voltage of a secondary battery with no appreciable depletion of energy stored therein. Furthermore, the battery charger of the present invention refreshes the battery to minimize energy loss due to self-discharge such that the battery remains fully charged while connected to the charger. Alternatively, the battery charger of the present invention maintains the battery at a predefined level of charge. The battery charger of the present invention eliminates the use of a shunt resistor network. Instead, a high impedance node is created at the low side of the battery for monitoring the battery voltage.

Figure 1:
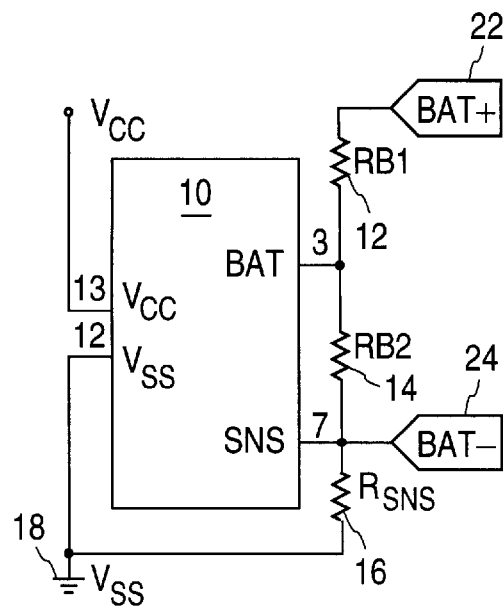
FIG. 1 is a conventional battery charger employing a shunt resistor network for monitoring the battery voltage.
Figure 2:
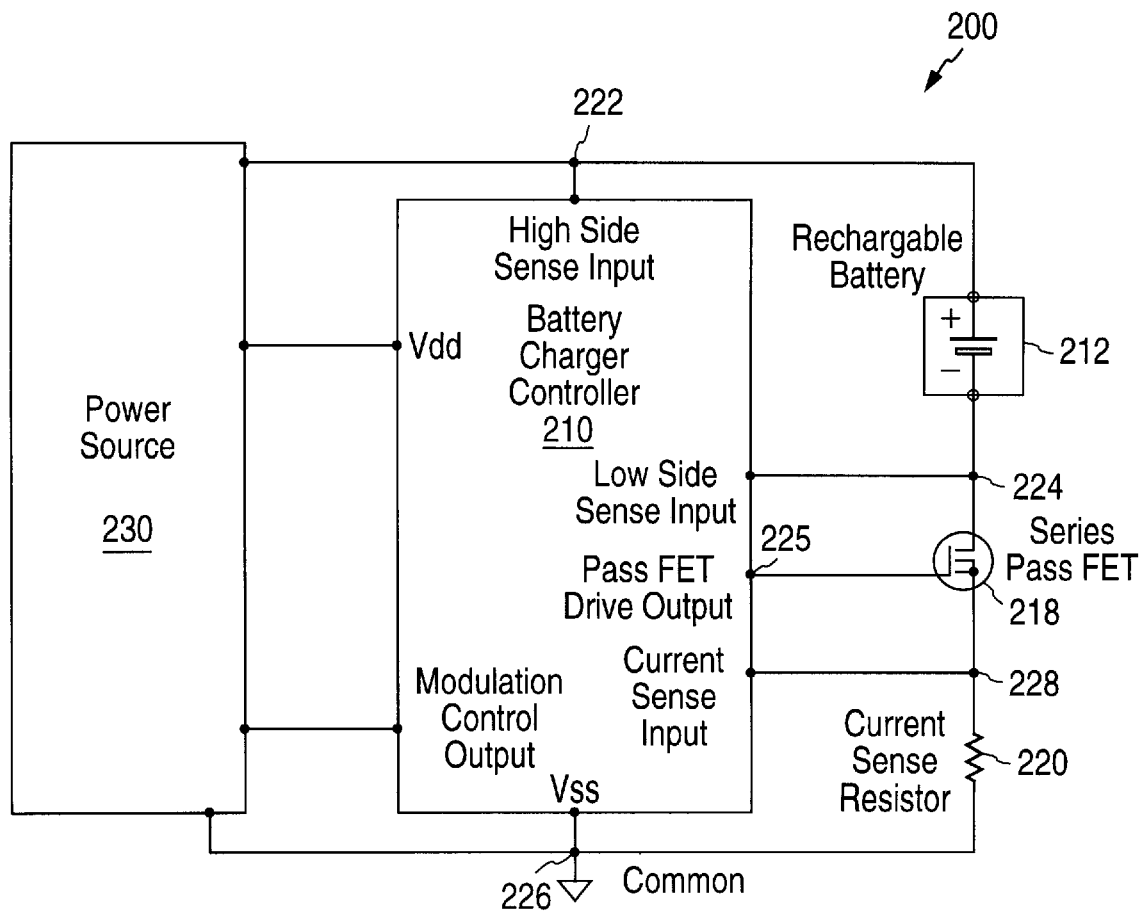
FIG. 2 is a block diagram of a battery charger in accordance with the present invention.

FIG. 2 illustrates one embodiment of a battery charger in accordance with the preset invention. Referring to FIG. 2, a battery charger 200 includes a charger controller 210 and a power source 230. A secondary battery (also called a rechargeable battery) 212, is shown connected to charger 200. The positive terminal of battery 212 is connected to a node 222 which is also connected to a high side sense input terminal of charger controller 210. The negative terminal of battery 212 is connected to a node 224 which is also connected to a low side sense input terminal of charger controller 210.

Power source 230 provides energy to charge battery 212 under the control of charger controller 210. In this embodiment, power source 230, in conjunction with charger controller 210, supports a charge mode and a top-off mode for charging battery 212. These charging functions are well known in the art and details of power source 230 and the charging operation will not be further described. The present invention may be operated with any type of power sources capable of charging a secondary battery.

In this embodiment, the charging cycle of charger controller 210 includes the charge mode for fully charging battery 212, and the top-off mode where battery 212 is trickle-charged for a predetermined period of time. In other embodiments, the charging cycle may further include a battery conditioning charge mode for charging a deeply discharged battery.

In the present embodiment, the charge mode of charger controller 210 includes two charge phases: a constant current phase and a constant voltage phase. Charger controller 210 first controls power source 230 to behave as a constant current source and charge battery 212 until the terminal voltage across battery 212 reaches a predefined voltage level, typically the prescribed maximum allowable terminal voltage associated with the particular type of rechargeable battery. Then, charger controller 210 controls power source 230 to behave as a constant voltage source. Under the constant voltage phase, as battery 212 continues to charge up, the charge current decreases exponentially. When the charging current drops below a predetermined current level, the top-off mode is engaged. During the top-off mode, charger controller 210 starts a timer to allow the charging current to flow for a predetermined period of time (the top-off period) whereby battery 212 is trickle-charged. After the top-off period, battery 212 is fully charged and the charging cycle of charger 200 is terminated. The charging cycle of charger 200 may include other charging modes known in the art.

Charger controller 210 also supports a monitor mode for monitoring the self-discharge of battery 212 upon termination of the charging cycle. In charge controller 210, battery energy loss under the monitor mode is primarily caused by the self-discharge of battery 212. The monitor mode and related circuitry of charger 200 permits monitoring of the battery voltage across battery 212 without significantly depleting the battery energy stored. This feature of the present invention is a significant improvement over prior art where the monitoring of the battery voltage itself contributes to the draining of the battery energy.

Charger controller 210 further supports a charge maintenance mode. When charger controller 212 determines that battery 212 has lost a predetermined amount of energy through self-discharge, charger controller 210 initiates the charge maintenance mode where either battery 212 is recharged back up to its full capacity or battery 212 is prevented from further energy loss. The operation of the monitor mode and the charge maintenance mode of the present invention will be described in more detail below.

Referring again to FIG. 2, battery charger 200 further includes an N-channel pass field effect transistor (FET) 218 and a current sense resistor 220. FET 218 has a drain terminal connected to node 224, a source terminal connected to a node 228 which also connects to a Current Sense Input terminal of charger controller 210, and a gate terminal connected to a pass FET drive output terminal 225 of charger controller 210. FET 218 serves several functions. In the present embodiment, FET 218 acts a switch regulating the flow of charging current through battery 212. In other embodiments, FET 218 also serves as a linear regulator under the battery conditioning charge mode for charging a deeply discharged battery. During the charging cycle, FET 218 is turned on, allowing charging current to flow through battery 212. As will be described in more detail below, when the charging cycle is terminated, FET 218 is turned off to create a high impedance node at the low side of battery 212 (node 224).

In the present embodiment, current sense resistor 220 is provided to measures the charging current flowing out of battery 212. Current sense resistor 220 is connected across node 228 and a ground node 226 ("Vss"). Current sense resistor 220 converts the current measurement to a voltage level which is provided to charger controller 210 at the Current Sense Input terminal. The placement of current sense resistor 220 in battery charger 200 is not essential to the operation of the present invention. In other embodiments, current sense resistor 220 can be place at the battery high side to measure the charging current and the source terminal of FET 218 can be directly connected to ground node 226.

Figure 4:
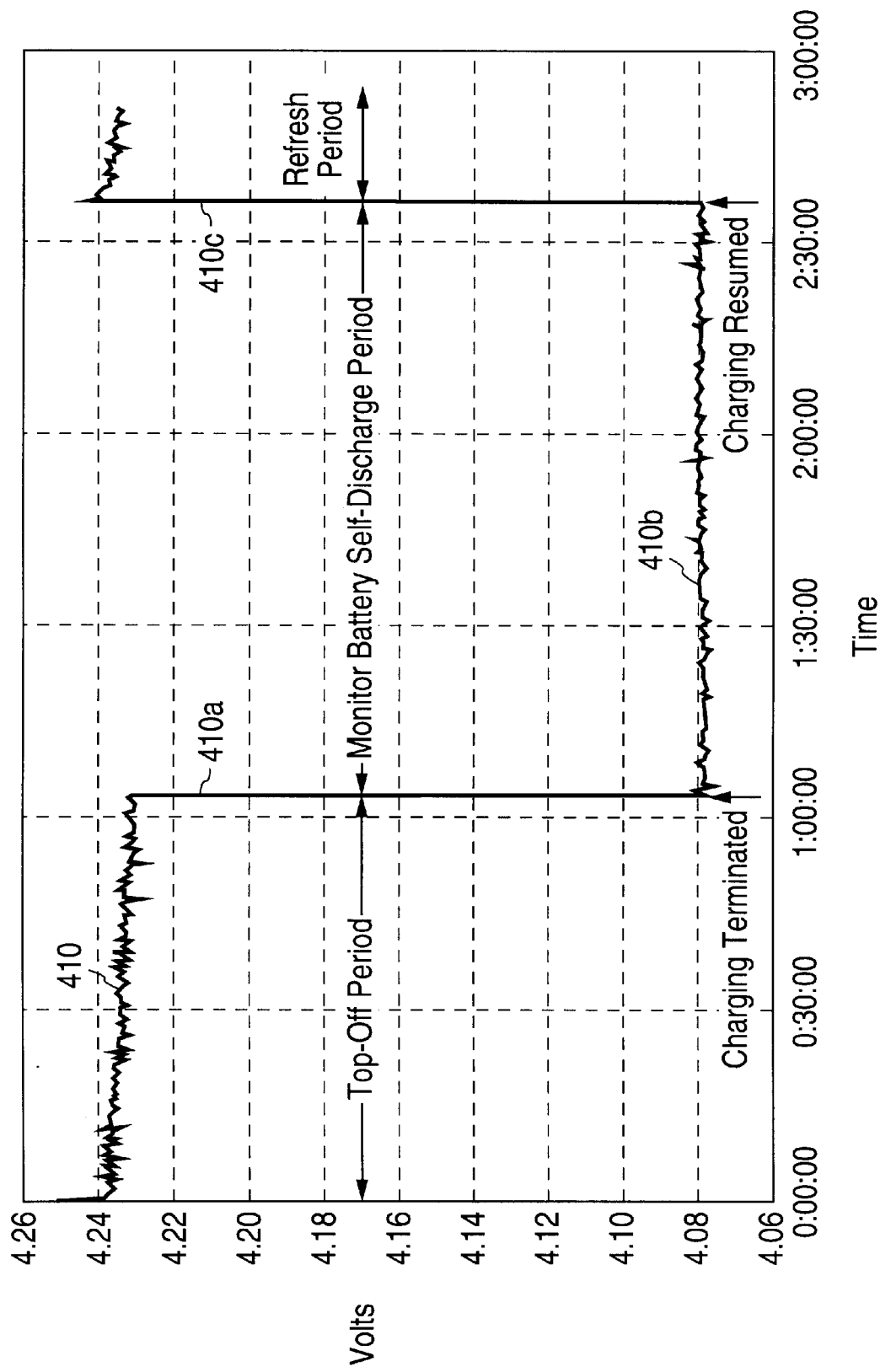
FIG. 4 a plot of the Battery High Side voltage curve versus time illustrating the operation of the battery charger of the present invention.
Figure 5:
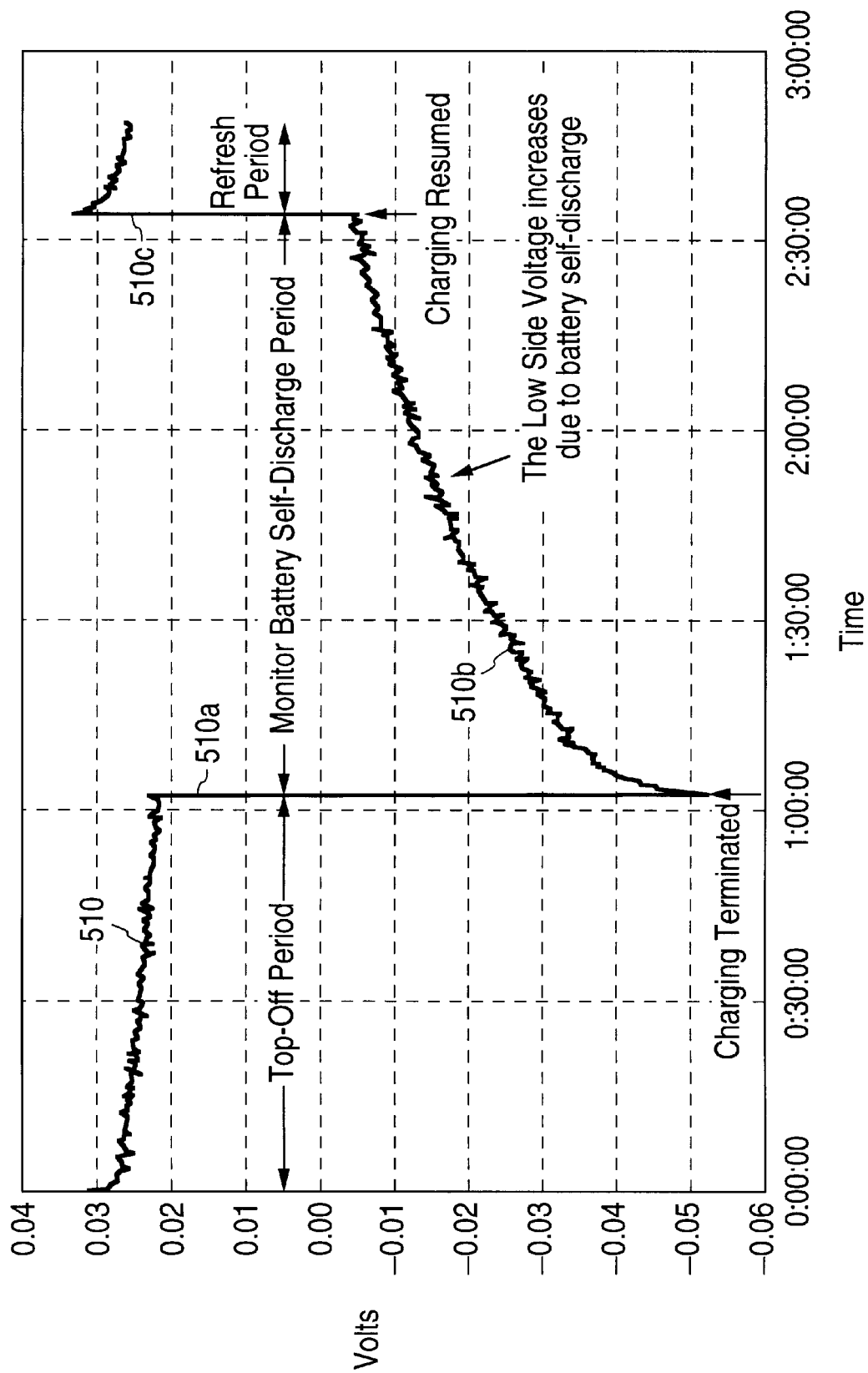
FIG. 5 a plot of the Battery Low Side voltage curve versus time illustrating the operation of the battery charger of the present invention.
Figure 6:
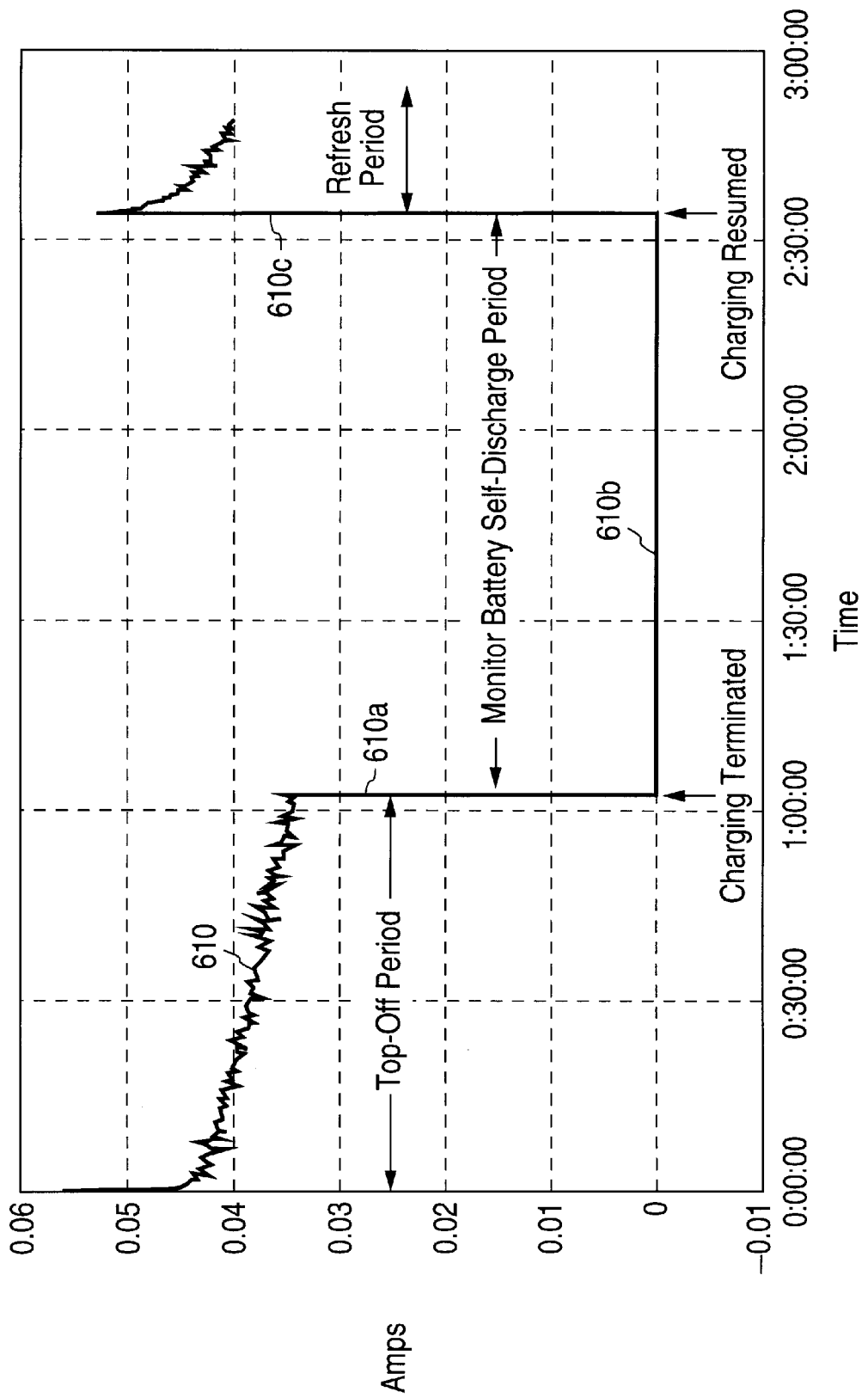
FIG. 6 a plot of the Battery Charge Current curve versus time illustrating the operation of the battery charger of the present invention.

The operation of charger 200, and specifically the operation of the monitor mode of charger controller 210 is described further with reference to FIGS. 4 to 6. FIGS. 4 to 6 are voltage and current curves obtained by operating a coke anode Li+ battery as battery 212 in battery charger 200 of the present invention. FIGS. 4 to 6 are used to illustrate the operational characteristics of charger 200 and does not limit the application of the present invention for use with a code anode Li+ type battery only. In fact, charger 200 of the present invention can be applied to operate with any types of rechargeable battery, particularly those that are susceptible to self-discharge. FIGS. 4 to 6 illustrate the voltage and current curves of battery 212 during the top-off period, the monitor period and the refresh period. In particular, curve 410 in FIG. 4 illustrates the battery high side voltage with respect to ground, curve 510 in FIG. 5 illustrates the battery low side voltage with respect to ground, and curve 610 in FIG. 6 illustrates the battery charge current as measured by current sense resistor 220. In FIGS. 4 to 6, battery 212 is assumed to have been fully charged at time 0, therefore, charger 200 has entered the top-off mode at time 0.

Under the top-off mode, battery 212 is trickle-charged for a predetermined period of time. In this embodiment, the top-off period is one hour. At the end of the top-off period, the charge current is interrupted and charger controller 210 transitions into the monitor mode. The termination of the top-off mode is illustrated in FIG. 6 where curve portion 610a, representing the charge current, drops to 0 Amps at a time just past 1 hour. The charge current remains at 0 Amps throughout the monitor period between the time 1 hour and a time just past 2 hours and 30 minutes (curve portion 610b in FIG. 6).

At the end of the top-off period, battery 212 is fully charged. Therefore, the maximum allowable terminal voltage for battery 212 should be present across its positive and negative terminals. In this embodiment, battery 212 is a coke anode Li+ battery having a nominal maximum terminal voltage of 4.2 volts. In FIG. 4, curve 410, representing the battery high side voltage relative to ground, is at approximately 4.23 volts at the end of the top-off period. In FIG. 5, curve 510, representing the battery low side voltage relative to ground, is at approximately 20 mV at the end of the top-off period. The terminal voltage of battery 212 is the difference between curves 410 and 510 which is 4.21 volts. In the present embodiment, the measured terminal voltage of battery 212 is within 10 mV of the nominal value of 4.20 volts. In FIGS. 4 and 5, the battery high side and low side voltages show a slight decrease during the top-off period. The voltage decrease is observed because the common mode voltage of the battery is the voltage across resistor 220 and that voltage tracks the charging current which is also gradually decreasing during the top-off period.

As mentioned previously, when charging of battery 212 has terminated, charger 200 enters a monitor mode. Under the monitor mode, charger controller 210 creates a high impedance node at the low side of battery 212, that is at node 224. The high impedance node is created to allow battery 212 to float during the monitor period and is critical in inhibiting current flow from battery 212. The high impedance node eliminates all ohmic path between the positive and negative terminals of battery 212, ensuring that charger controller 210 presents a negligible load to battery 212. Thus, under the monitor mode, essentially no energy is drained from battery 212 except for those lost due to self-discharge.

The high impedance node at node 224 is created by first turning off FET 218. Charger controller 210 directs pass FET drive output terminal 225 to apply a predefined voltage to the gate of FET 218, pulling the gate to a low state and turning FET 218 off. FET 218 no longer provides a current path between the negative terminal of battery 212 and ground node 226. Second, charger controller 210 opens an internal switch to make the low side sense input terminal to be high impedance. The switching action is explained with reference to FIG. 3.

Figure 3:
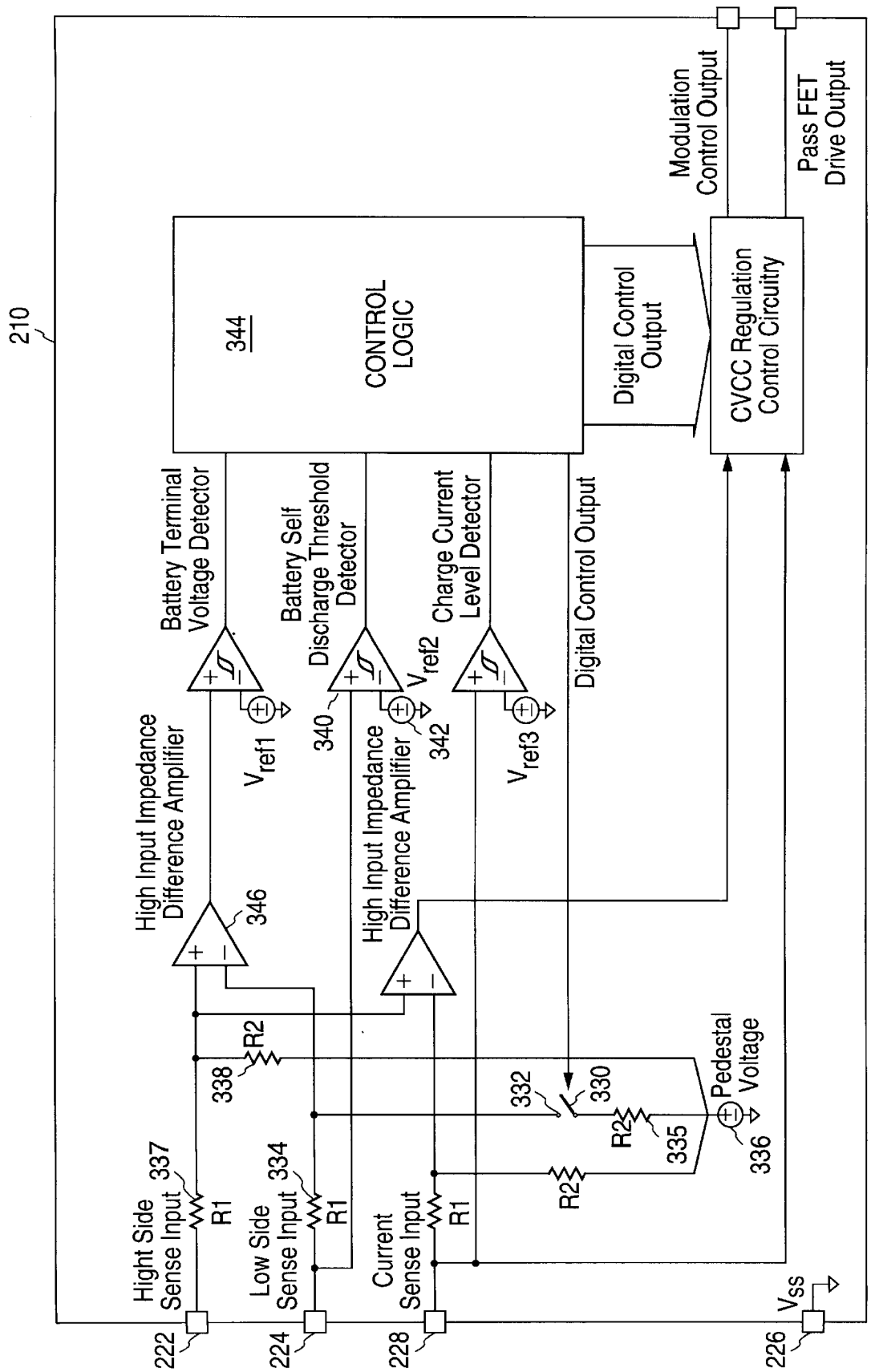
FIG. 3 is a block diagram of the internal circuitry of a battery charger controller of the present invention.

FIG. 3 is a block diagram of the internal circuitry of charger controller 210. In FIG. 3, low side sense input terminal at node 224 is connected to a resistor 334. Resistor 334 together with resistor 335 attenuate the battery low side voltage to a level suitable for processing by the internal circuitry of charger controller 210. The other terminal of resistor 334 (node 332) is connected to a negative input terminal of an amplifier 346. Amplifier 346 also receives the battery high side voltage on node 222 through attenuation resistors 337 and 338 and functions to measure the battery terminal voltage. The input terminals to amplifier 346 are high impedance inputs and draw no DC current. Node 332 is further connected to one terminal of a switch 330. The other terminal of switch 330 is connected to a biasing circuit which, in this embodiment, is a bias voltage source 336. Bias voltage source 336 is used to bias node 332 to a proper voltage and is not essential to the concept of the present invention. In other embodiments, bias voltage source 336 may be replaced with a short to ground. Switch 330 receives a control signal from control logic 344. The low side sense input terminal (node 224) is further connected to a comparator 340 for measuring the battery low side voltage. The operation of comparator 340 under the monitor mode to monitor the self-discharge of battery 212 will be described in more detail below.

The principle function of switch 330 is to remove essentially all DC loading from the low side sense input terminal (node 224) of charger controller 210 when the monitor mode is initiated. Charger controller 210 opens switch 330 when the monitor mode is initiated. Node 332 is thus disconnected from the biasing circuit and becomes floating. Since the low side sense input terminal remains connected only to other high impedance nodes within charger controller 210, low side sense input terminal becomes high impedance when switch 330 is opened. In this embodiment, switch 330 is placed between resistors 334 and 335. In other embodiments, switch 330 can be placed in other positions within charger controller 210 as long as switch 330 achieves its principle function of removing essentially all DC loading from node 224. Thus, in an alternate embodiment, switch 330 can be connected between node 224 and resistor 334.

Under the monitor mode, charger controller 210 turns off FET 218 and opens switch 330 to make node 224 a high impedance node. As a result, battery 212 in charger 200 is allowed to float during the entire monitor period. After creating a high impedance node at the low side of battery 212, charger controller 210 regulates the battery high side voltage at node 222 to a predetermined value below the maximum allowable terminal voltage of battery 212. In this embodiment, the battery high side voltage is down-regulated to a value of 4.08 volts as illustrated in FIG. 4. In FIG. 4, at a time just past 1 hour when the monitor mode is initiated, the battery high side voltage, illustrated by curve portion 410a, is decreased from a value of 4.23 volts to a value of 4.08 volts. Because the battery high side voltage is regulated to 4.08 volts while battery 212 is fully charged at 4.2 volts and is floating, the battery low side voltage, in response, will decrease to a voltage value a few millivolts below ground. As illustrated in FIG. 5, the battery low side voltage, represented by curve portion 510a, drops to a value of −55 mV when the monitor period commences because the battery high side voltage was down-regulated to a value below the maximum allowable terminal voltage of battery 212.

Under the monitor mode, charger controller 210 monitors the terminal voltage of battery 212 by measuring the battery low side voltage using a high input impedance comparator. Referring to FIG. 3, the low side sense input terminal of charger controller 210 at node 224 is connected to a positive input terminal of comparator 340, also called the battery self-discharge threshold detector. The negative terminal of comparator 340 is connected to a reference voltage source 342 which is set to a predetermined reference voltage value. Comparator 340 compares the battery low side voltage with the reference voltage set in reference voltage source 342 to determine whether battery 212 has self-discharged a sufficient amount such that the charge maintenance mode should be engaged.

During the monitor period, neither the internal circuitry of charger controller 210 nor FET 218 drains significant energy from battery 212. Instead, battery 212 loses energy primarily through self-discharge. As battery 212 discharges through self-discharge, the terminal voltage across battery 212 gradually decreases. Because the battery high side voltage is regulated to a fixed value (in this embodiment, 4.08 volts), the decrease in the battery terminal voltage causes the battery low side voltage to gradually rise from −55 mV up to ground or above. This gradual increase in the battery low side voltage can be observed in FIG. 5. During the monitor period, curve portion 510b increases from its original value of −55 mV to a value of −5 mV. Correspondingly, curve portion 410b in FIG. 4 illustrates that the battery high side voltage is being regulated at 4.08 volts during the entire monitor period.

Comparator 340 monitors the battery low side voltage until the voltage rises to a value substantially equal to the predetermined reference voltage value set in reference voltage source 342. Then comparator 340 asserts its output, triggering control logic 344 in charger controller 210 to initiate the charge maintenance mode. In this embodiment, the reference voltage value in reference voltage source 342 is set at −5 mV. Thus, when the battery low side voltage (curve portion 510b) rises to a value of −5 mV at a time just past 2 hours and 30 minutes, the charge maintenance mode is initiated. In other embodiments, the reference voltage value in reference voltage source 342 can be set to any desired value, including 0 volt. In principle, the reference voltage value determines the desired amount of capacity loss battery 212 will sustain before further action is to be taken by charger controller 210.

Charger controller 210 initiates a charge maintenance mode when the energy loss in battery 212 through self-discharge reaches the predetermined level set by the reference voltage in reference voltage source 342. In the present embodiment, the charge maintenance mode includes a refresh mode whereby charger controller 210 initiates the charging cycle as previously described to recharge battery 212 back up to its full capacity. Referring to FIGS. 4 and 5, when the refresh mode is engaged, charger controller 210 regulates the battery high side voltage back up to approximately 4.24 volts (curve portion 410c in FIG. 4) to allow battery 212 to be charged up to its maximum allowable capacity. At the same time, because the battery high side voltage is regulated up, the battery low side voltage (curve portion 510c in FIG. 5) follows and rises back up to 20 mV. While charger controller 210 is regulating the battery high side voltage back up, charger controller 210 also turns on FET 218 (FIG. 2) to allow the charging current to flow. Referring to FIG. 6, curve portion 610c indicates the initiation of the battery charge current when the refresh mode is engaged. Battery 212 is recharged under the charging cycle of charger 200 as previously described.

After battery 212 is recharged back up to its full capacity, charger controller 210 engages the monitor mode again. The monitor and recharge cycle repeats until a user removes battery 212 from charger 200 for use. Because the refresh mode has the advantage of guaranteeing that battery 212 is always fully charged in charger 200, the refresh mode is preferred when a certain desirable battery run time is critical to a user.

In another embodiment, the charge maintenance mode does not replenish the lost battery capacity. Instead, charger controller 210 initiates a trickle-charge phase to prevent further capacity loss. Under the trickle-charge phase, FET 218 is turned on and the battery high side voltage remains down regulated (e.g. 4.08 volts). This results in the flow of a trickle charge current to battery 212. The trickle charge current maintains the battery voltage at the value battery 212 has already discharged to and prevents battery 212 from continuing to discharge. The trickle-charge phase of the charge maintenance mode minimizes the repeated recharging of battery 212. Because the useful life of a rechargeable battery can be degraded by repeatedly recharging the battery, the trickle-charge phase is preferred when it is desirable to maximize the useful life of battery 212 and when the battery run time is not as critical such that the battery does not need to be absolutely fully charged for each use.

According to the present invention, neither the internal circuitry of charger controller 210 nor FET 218 significantly contributes to the discharge of battery 212. Thus, the primary discharge mechanism battery 212 faces is self-discharge. The only discernible loading charger 200 places on battery 212 during the monitor period is a junction leakage current through FET 218 and switch 330. The junction leakage current is a characteristic of semiconductor switches in an open state and has a value much less than 1 $\mu$A. Typically, the leakage current through FET 218 and switch 330 is a few tens of nanoamps. Battery charger 200 of the present invention limits the draining of battery energy during the monitor period and represents a significant improvement over prior art.

While in the present embodiment, battery charger 200 is illustrated in operation with a single cell battery pack, the single cell battery pack is illustrative only and is not intended to limit the application of battery charger 200 to operate with a single cell battery pack only. Battery charger 200 can be adopted to operate with a multi-cell battery pack (e.g. 2, 3 and 4 series cell battery packs) by adjusting the voltage and current levels accordingly.

The above detailed description are provided to illustrate the specific embodiments of the present invention and is not intended to be limiting. Numerous modifications and variations within the scope of the present invention are possible. The present invention is defined by the appended claims thereto.

I claim:

1. A battery charger for charging a secondary battery connected thereto, comprising:
    a charger controller having a high side sense input terminal connected to a high side of said battery, a low side sense input terminal connected to a low side of said battery, and a switch control output terminal; and
    a first switch connected to said low side of said battery and a ground node, said first switch controlled by said switch control output terminal of said charger controller;
    wherein after fully charging said battery, said charger controller monitors a terminal voltage of said battery by creating a high impedance node at said low side of said battery, regulating a battery high side voltage to a predetermined value lower than a maximum allowable terminal voltage for said battery, and measuring a battery low side voltage.

2. The battery charger of claim 1, wherein said charger controller creates said high impedance node by opening said first switch and making said low side sense input terminal high impedance.

3. The battery charger of claim 1, wherein said battery charger comprises a power source connected across said high side sense input terminal of said charger controller and said ground node for charging said battery, and when said battery low side voltage rises to a predetermined voltage level, indicating to said charger controller that said battery has lost capacity, said charger controller initiates a charge cycle in response to fully recharge said battery.

4. The battery charger of claim 1, wherein said battery charger comprises a power source connected across said high side sense input terminal of said charger controller and said ground node for charging said battery, and when said battery low side voltage rises to a predetermined voltage level, indicating to said charger controller that said battery has discharged to a predetermined capacity level, said charger controller initiates a trickle-charge cycle in response to maintain said battery at said predetermined capacity level.

5. The battery charger of claim 1, wherein said charger controller comprises a comparator for comparing said battery low side voltage with a reference voltage, such that when said battery has discharged to a predetermined capacity level though self-discharge, said battery low side voltage rises to become substantially equal to said reference voltage.

6. The battery charger of claim 5, wherein when said battery low side voltage rises to become substantially equal to said reference voltage, said charger controller initiates a charge cycle to fully recharge said battery.

7. The battery charger of claim 5, wherein when said battery low side voltage rises to become substantially equal to said reference voltage, said battery controller initiates a trickle-charge cycle to maintain said battery at said predetermined capacity level.

8. The battery charger of claim 1, wherein said first switch is a field effect transistor, said transistor having a gate terminal connected to said switch control output terminal, a drain terminal connected to said low side of said battery, and a source terminal connected to said ground node, and wherein said charger controller creates said high impedance node by turning off said field effect transistor.

9. The battery charger of claim 8, further comprising:
    a current sense resistor connected between said source terminal of said field effect transistor and said ground node for measuring a charge current of said charger.

10. The battery charger of claim 1, wherein said charger controller further comprises:
    a second switch connected between said low side sense input terminal and a bias voltage; and
    a comparator having a first input terminal connected to said low side sense input terminal, a second input terminal connected to a reference voltage source, and an output terminal connected to a control logic block, said reference voltage source being set to a first voltage value;
    wherein said charger controller makes said low side sense input terminal high impedance by opening said second switch.

11. The battery charger of claim 10, wherein said charger controller monitors said terminal voltage of said battery by comparing said battery low side voltage to said first voltage value at said comparator, said comparator asserts said output terminal when said battery low side voltage rises to become substantially equal to said first voltage value, indicating that said battery has discharged to a predetermined capacity level through self-discharge.

12. The battery charger of claim 11, wherein said battery charger comprises a power source connected across said high side sense input terminal of said charger controller and said ground node for charging said battery, and when said comparator in said charger controller asserts said output terminal, said control logic block directs said charger controller to regulate said battery high side voltage back up to said maximum allowable terminal voltage, and to initiate a charge cycle to fully recharge said battery.

13. The battery charger of claim 11, wherein said battery charger comprises a power source connected across said high side sense input terminal of said charger controller and said ground node for charging said battery, and when said comparator in said charger controller asserts said output terminal, said control logic block directs said charger controller to initiate a trickle-charge cycle to maintain said battery at said predetermined capacity level.

14. The battery charger of claim 1, further comprising:
a current sense resistor connected between said first switch and said ground node for measuring a charge current of said charger.

15. A method for monitoring a terminal voltage of a secondary battery upon completion of a charge cycle, said battery having a battery low side and a battery high side, said method comprises the steps of:
creating a high impedance node at said battery low side;
regulating a high side voltage at said battery high side to a predetermined value less than a maximum allowable terminal voltage of said battery, said step of regulating said high side voltage causing a low side voltage at said battery low side to decrease to a value less than ground; and
measuring said low side voltage relative to a reference voltage value;
wherein said low side voltage increases towards said reference voltage value as said battery discharges through self-discharge.

16. The method of claim 15, further comprising the steps of:
initiating a charge maintenance mode when said low side voltage increases to a value substantially equal to said reference voltage value, indicating that said battery has discharged to a predetermined capacity level.

17. The method of claim 16, wherein said charge maintenance mode comprises the steps of:
regulating said high side voltage back up to a value substantially equal to said maximum allowable terminal voltage of said battery; and
initiating a charge cycle for charging said battery back up to a full capacity.

18. The method of claim 16, wherein said charge maintenance mode comprises the step of:
initiating a charge cycle for trickle-charging said battery to maintain said battery at said predetermined capacity level.

19. A method for monitoring a terminal voltage of a secondary battery upon completion of a charge cycle, said battery having a battery low side and a battery high side, said method comprises the steps of:
providing a battery charger controller having a high side terminal and a low side terminal;
providing a first switch connected between said low side terminal and a ground node, said first switch controlled by said battery charger controller;
connecting said battery high side to said high side terminal and said battery low side to said low side terminal of said charger controller;
applying a predefined voltage to said first switch to open said first switch;
creating a high impedance node at said low side terminal of said charger controller;
regulating a high side voltage at said battery high side to a predetermined value less than a maximum allowable terminal voltage of said battery, said step of regulating said high side voltage causing a low side voltage at said battery low side to decrease to a value less than ground; and
measuring said low side voltage relative to a reference voltage;
wherein said low side voltage increases towards said reference voltage as said battery discharges through self-discharge.

20. The method of claim 19, wherein said first switch is a field effect transistor having a gate terminal controlled by said battery charger controller, a drain terminal connected to said battery low side, and a source terminal connected to said ground node, and wherein said step of applying a predefined voltage to said first switch comprises the step of applying a predefined voltage to said gate of said field effect transistor to turn said transistor off.

21. The method of claim 19, further comprising the steps of:
initiating a charge maintenance mode when said low side voltage increases to a value substantially equal to said reference voltage, indicating that said battery has discharged to a predetermined capacity level.

22. The method of claim 21, wherein said step of initiating a charge maintenance mode comprises the steps of:
regulating said high side voltage back up to a value substantially equal to said maximum allowable terminal voltage of said battery; and
initiating a charge cycle for charging said battery back up to a full capacity.

23. The method of claim 21, wherein said step of initiating a charge maintenance mode comprises the step of:
initiating a charge cycle for trickle-charging said battery to maintain said battery at said predetermined capacity level.

* * * * *